(12) United States Patent
Yakout et al.

(10) Patent No.: US 9,619,494 B2
(45) Date of Patent: Apr. 11, 2017

(54) SCALABLE AUTOMATIC DATA REPAIR

(75) Inventors: Mohamed Yakout, Doha (QA); Ahmed K. Elmagarmid, Doha (QA); Laure Berti-Equille, Aix-en-Provence (FR)

(73) Assignee: QATAR FOUNDATION, Doha (QA)

( * ) Notice: Subject to any disclaimer, the term of this patent is extended or adjusted under 35 U.S.C. 154(b) by 160 days.

(21) Appl. No.: 13/115,253

(22) Filed: May 25, 2011

(65) Prior Publication Data
US 2012/0303555 A1  Nov. 29, 2012

(51) Int. Cl.
G06F 17/30 (2006.01)

(52) U.S. Cl.
CPC .............. *G06F 17/30303* (2013.01)

(58) Field of Classification Search
CPC ........................................ G06F 17/30
USPC ................................ 706/12; 707/5
See application file for complete search history.

(56) References Cited

U.S. PATENT DOCUMENTS

| 7,949,687 B1 * | 5/2011 | Sinclair ................... 707/803 |
| 2009/0198678 A1 * | 8/2009 | Conrad et al. ............ 707/5 |

FOREIGN PATENT DOCUMENTS

| GB | 2492528 A | 1/2013 |
| WO | 2012-160171 A2 | 11/2012 |

OTHER PUBLICATIONS

Elmagarmid, A.K.; Ipeirotis, P.G.; Verykios, V.S., "Duplicate Record Detection: A Survey," Knowledge and Data Engineering, IEEE Transactions on , vol. 19, No. 1, pp. 1,16, Jan. 2007 doi: 10.1109/TKDE.2007.250581.*
Yakout et. al, Guided Data Repair, Journal Proceedings of the VLDB Endowment VLDB, vol. 4 Issue 5, Feb. 2011, pp. 279-289.*
Yakout et. al, GDR: A System for Guided Data Repair, SIGMOD 2010 , Jun. 2010, pp. 1223-1225.*
Jian Zhou, Zhixu Li, Binbin Gu, Qing Xie, Jia Zhu, Xiangliang Zhang, Guoliang Li, "CrowdAidRepair: A Crowd-Aided Interactive Data Repairing Method.", In: DASFAA (1), pp. 51-66, 2016.*
Eschrich, Steven et al., "Soft Partitions Lead to Better Learned Ensembles," Fuzzy Information Processing Society Proceedings, 2002 Annual Meeting of the North American, Dept of Computer Science and Engrng, ENB 188, Univ of South Fla, IEEE, 978-0/7803-7461-4/02, pp. 406-411 (2002).

(Continued)

*Primary Examiner* — Michael B. Holmes
*Assistant Examiner* — Ola Olude Afolabi
(74) *Attorney, Agent, or Firm* — Mossman Kumar & Tyler PC

(57) ABSTRACT

A computer implemented method for generating a set of updates for a database comprising multiple records including erroneous, missing and inconsistent values, the method comprising using a set of partitioning functions for subdividing the records of the database into multiple subsets of records, allocating respective ones of the records to at least one subset according to a predetermined criteria for mapping records to subsets, applying multiple machine learning models to each of the subsets to determine respective candidate replacement values representing a tuple repair for a record including a probability of candidate and current values for the record, computing probabilities to select replacement values for the record from among the candidate replacement values which maximise the probability for values of the record for an updated database.

20 Claims, 6 Drawing Sheets

(56) References Cited

OTHER PUBLICATIONS

Van Hulse, Jason et al., "A Novel Noise Filtering Algorithm for Imbalanced Data," 2010 9th Int'l Conf. on Machine Learning and Applications, Fla. Atlantic University, DOI 10.1109/ICMLA.2010.9 IEEE, pp. 9-14 (2010).
UK IPO Search Report in GB1109063.6 dated Sep. 21, 2011.
ISR and Written Opinion in PCT/EP2012/059772 dated Dec. 21, 2012.

* cited by examiner

|     | city      |     | state |     | zip   |     | block name |
| --- | --------- | --- | ----- | --- | ----- | --- | ---------- |
| $t_1'$ | Wlafayette | 0.1 | IL | 0.3 | 47906 | 0.1 | $b_1$ |
| $t_2'$ | Wlafayette | 0.2 | IL | 0.2 | 47906 | 0.2 | $b_2$ |
| $t_3'$ | Wlafayette | 0.1 | IL | 0.3 | 47906 | 0.1 | $b_3$ |
| $t_4'$ | Wlafayette | 0.2 | IL | 0.2 | 47906 | 0.3 | $b_4$ |
| $t_5'$ | Lafayette | 0.9 | IN | 0.7 | 47907 | 0.5 | $b_1$ |
| $t_6'$ | Lafayette | 0.6 | IL | 0.2 | 47906 | 0.2 | $b_2$ |
| $t_7'$ | lafytte | 0.2 | IN | 0.6 | 47907 | 0.6 | $b_3$ |
| $t_8'$ | Wlafayette | 0.2 | IL | 0.2 | 47906 | 0.3 | $b_4$ |

For the same tuple $t_1$, these are the "original attributes values" with their prediction probabilitites from each block For the same tuple $t_1$, these are the "predected attributes values" with their prediction probabilitites from each block

Figure 4

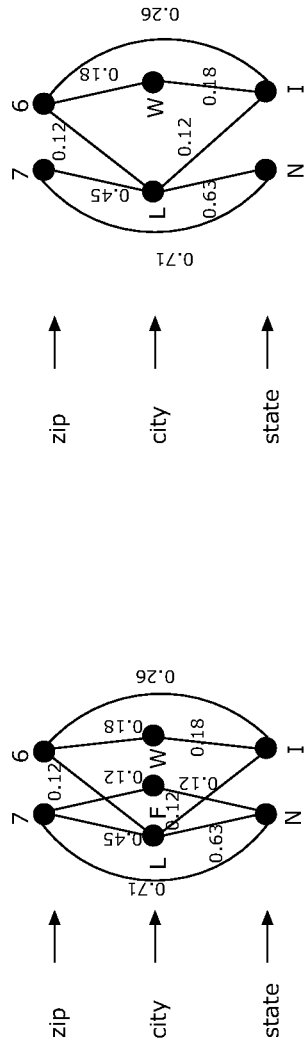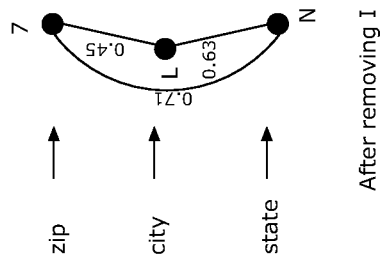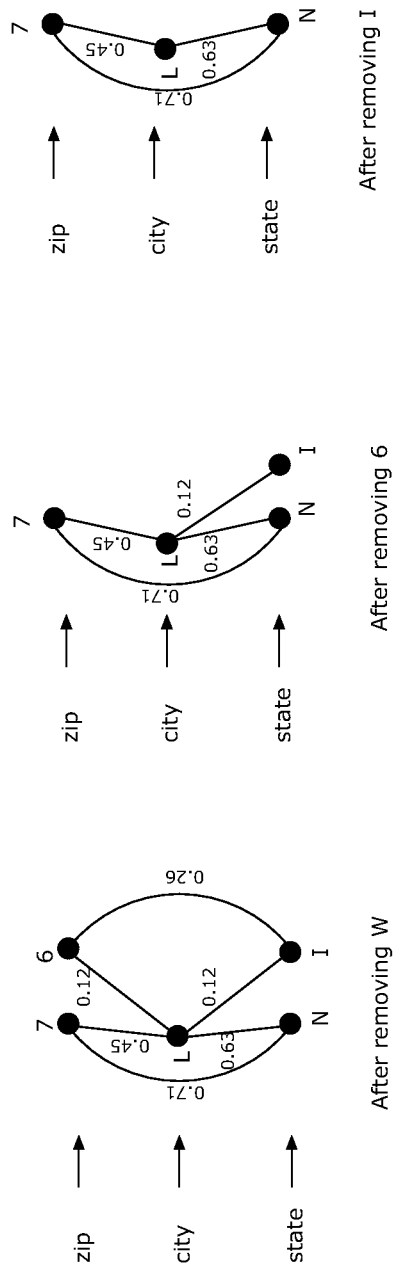

SCALABLE AUTOMATIC DATA REPAIR

BACKGROUND

A database is a collection of information arranged in an organized manner. A typical database might include medical, financial or accounting information, demographics and market survey data, bibliographic or archival data, personnel and organizational information, public governmental records, private business or customer data such as addresses and phone numbers, etc.

Such information is usually contained in computer files arranged in a pre-selected database format, and the data contents within them can be maintained for convenient access on magnetic media, both for storage and for updating the file contents as needed.

Poor data quality can have undesirable implications for the effectiveness of a business or other organization or entity. For example, in healthcare, where incorrect information about patients in an Electronic Health Record (EHR) may lead to wrong treatments and prescriptions, ensuring the accuracy of database entries is of prime importance.

A large variety of computational procedures for cleaning or repairing erroneous entries in databases have been proposed. Typically, such procedures can automatically or semi-automatically identify errors and, when possible, correct them. Typically, however, these approaches have several limitations relating to the scalability of the method used, especially when repairs or updates to larger databases are desired, and in terms of the accuracy of values to be used as replacements values for determined errors.

SUMMARY

According to an example, there is provided a computer implemented method for generating a set of updates for a database comprising multiple records including erroneous, missing and inconsistent values, the method comprising using a set of partitioning functions for subdividing the records of the database into multiple subsets of records, allocating respective ones of the records to at least one subset according to a predetermined criteria for mapping records to subsets, applying multiple machine learning models to each of the subsets to determine respective candidate replacement values representing a tuple repair for a record including a probability of candidate and current values for the record, computing probabilities to select replacement values for the record from among the candidate replacement values which maximise the probability for values of the record for an updated database.

In an example, the method includes minimising a distance measure determined using a distance function between the updated database and the database. Preferably, a number of changes to be made to the database to arrive at the updated database using the replacement values can be limited to a predetermined maximum value. Duplicate records of the database can be determined, such that subdividing includes subdividing records of the database minus the determined duplicate records. In an example, selecting the maximum value can be based on the size of the database and a number of desired iterations for the steps of using, generating, applying and computing.

According to an example, the set of partitioning functions can be horizontal partitioning functions constructed according to a requirement that similar records are allocated to the same partition. Similar records can be determined using a hash function to generate checksums for respective ones of the records and by comparing the checksums. Preferably, selecting replacement attribute values includes generating a graph including multiple vertices and multiple edges for connecting certain ones of the vertices, wherein each vertex of the graph represents an attribute value, and an edge connecting two vertices represents a probability for the occurrence of those attribute values in a single replacement record. In an example, the number of partition functions in the set of partition functions is restricted to a predetermined maximum number.

According to another example, there is provided a computer program embedded on a non-transitory tangible computer readable storage medium, the computer program including machine readable instructions that, when executed by a processor, implement a method for updating a database comprising partitioning records of the database into multiple sets of records using a set of partitioning functions over the records of the database, determining a set of candidate replacement data values for respective records in each of the multiple sets using multiple machine learning models applied on the sets, selecting an update for a record from the set of candidate replacement data values which maximally preserves a relationship in the database, and updating the database using the selected update to provide an updated database with a minimal number of alterations. In an example, this can include minimising a distance measure determined using a distance function between the updated database and the database. In an example, the method for updating a database can further comprise limiting a number of changes to be made to the database to arrive at the updated database to a predetermined maximum value.

Preferably, it is possible to determine duplicate records of the database, and perform partitioning on records of the database minus the determined duplicate records. The method can further comprise selecting the maximum value based on the size of the database and a number of desired iterations for the steps of partitioning, determining, selecting and updating. In an example, the set of correlations can be constructed using machine learning models according to a requirement that similar records are allocated to the same partition. Similar records can be determined using a hash function to generate checksums for respective ones of the records and by comparing the checksums.

According to an example, it is possible to generate a graph including multiple vertices and multiple edges for connecting certain ones of the vertices, wherein each vertex of the graph can represent an attribute value of a record, and an edge connecting two vertices can represent a probability for the occurrence of those attribute values in a single record.

According to an example, there is provided a method for repairing data values in multiple records of a database comprising determining a set of candidate changes for the records which simultaneously minimise a number of alterations to the database and maximise a probability value for the accuracy of the candidate changes. Determining a set of candidate changes can include dividing records of the database across multiple partitions, deriving a set of models for records in each partition to determine a probability value for an existing data value and updated data value, and selecting a data value according to the probability value to provide a candidate change for a tuple repair to the database.

BRIEF DESCRIPTION OF THE DRAWINGS

An embodiment of the invention will now be described, by way of example only, and with reference to the accompanying drawings, in which:

FIG. 4 is a table illustrating tuple repairs with prediction probability values according to an example;

FIGS. 5a-e illustrate graphs for determining a tuple repair according to an example.

DETAILED DESCRIPTION

Figure 1:
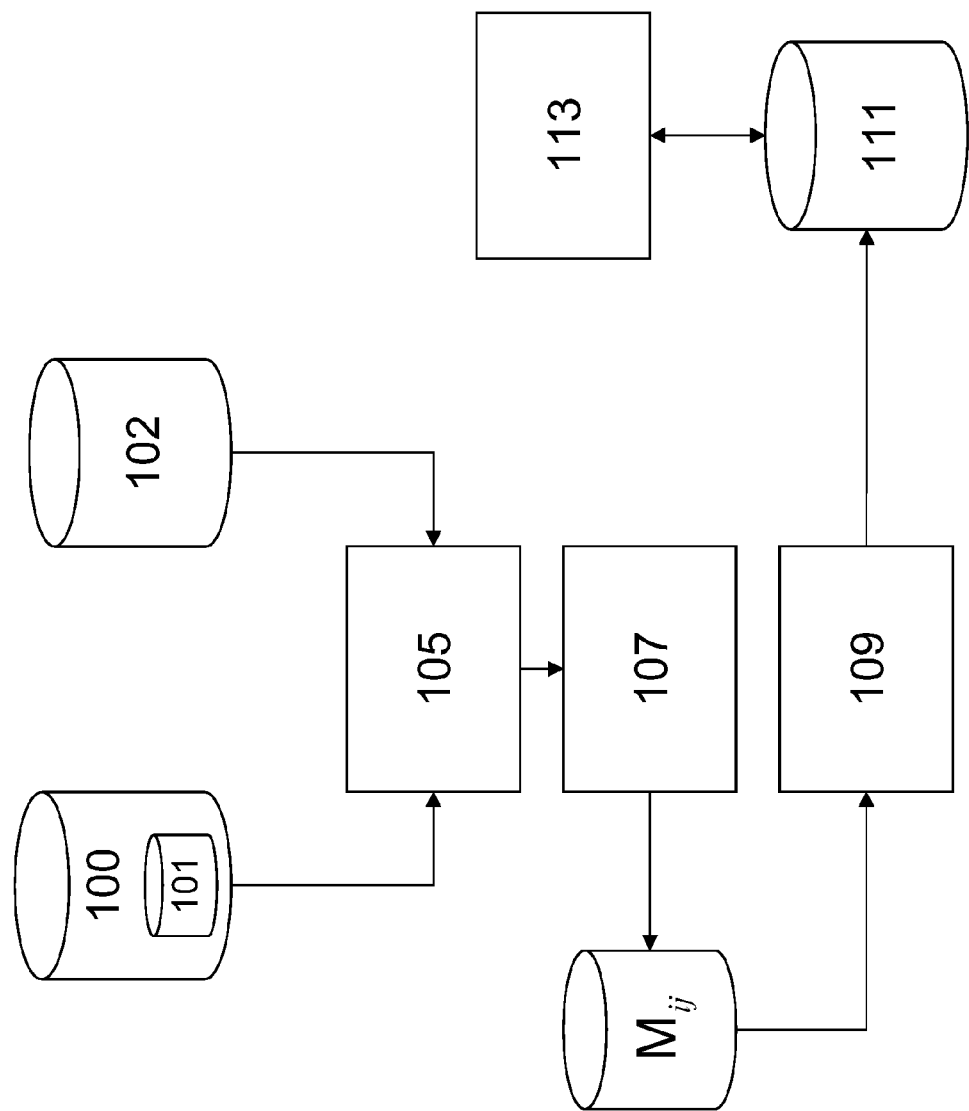
FIG. 1 is a schematic block diagram of a method for determining a set of updates for a database according to an example.

A challenge in repairing dirty databases is scalability. For the case of a maximal likelihood repair, a scalability issue is typically due to the reason that a repairing process involves learning a statistical model from data values of the database and predicting attribute values. Typically, this process will be at least quadratic in the database size. Moreover, the learning process and the model itself may not fit in a main memory of a computing apparatus or other device which is being used to determine and perform the repairs.

According to an example, there is provided a method, which can be a computer implemented method for example, and a computer program embedded on a non-transitory tangible computer readable storage medium for maximizing data likelihood in a database whilst causing a minimal number of changes within the database such as by using only an allowed amount of changes to the data, in order to correct any errors, omissions or inaccuracies. Accordingly, selected updates can be applied that will preserve any existing relationships in the original data.

According to an example, machine learning (ML) techniques can aid in repairing erroneous data by statistically modelling existing correlations between data values in a database and by providing predicted updates. The necessity to predefine database constraints can therefore be avoided since they are inferred by ML models. A method according to an example provides a mechanism for horizontal data partitioning of records in a database to enable scalability and parallel processing of data blocks. Various ML methods can be applied to each block to predict data values for replacing erroneous or missing ones for example. Replacement values are locally and globally correct since they can be corroborated by a coalition of ML methods.

According to an example, predictions using ML models from several data partitions can be combined. A measure for the certainty of predicted values for the individual models can be determined taking into account the models' reliability in terms of minimizing the risk of the predictions, as well as the significance of the sizes of the partitions used in the learning process. Local predictions for an attributes data value of a particular record (or tuple) can be incorporated into a graph optimization problem to take into account the ML models' dependency and to ensure the global correctness of the final tuple repair prediction.

Given a database D defined over relation R with attributes attr(R) and a set of constraints $\Sigma$ such that $D|\neq\Sigma$, that is, D violates some constraints of $\Sigma$, repairing the database with the minimum number changes to data values of records of the database can be formalized by defining another database D' such that $D'|=\Sigma$ and Dist(D,D') is minimal, where Dist is a distance function between the databases. According to an example a distance function between the two databases can be defined as:

$$Dist(D, D') = \sum_{\forall t \in D, A \in attr(R)} d_A(t[A], t'[A])$$

where $t' \in D'$ is a repaired tuple corresponding to tuple $t \in D$ and $d_A(t[A],t'[A])$ is a distance function for the domain values of attribute A that returns a score between 0 and 1. t[A] refers to the value of attribute A in tuple t. Typically, distance functions can include functions for string attributes and functions for numerical attributes, such as a function for determining a normalized distance for example.

To maximize the probability of each tuple t in the database given the observation of the rest of the database, that is: p(t|D\t), statistical ML methods can learn data relationships in a model (or a set of models) M according to an example, and hence p(t|D\t)≈p(t|M). In an example, the model M represents relationships in the data that statistically hold. Therefore, an objective can be to maximize the likelihood (or log likelihood) of the data given the learnt model M, i.e., L(D|M) where:

$$L(D \mid \mathcal{M}) = \sum_{t \in D} \log p(t \mid \mathcal{M})$$

and where p(t|M) is the joint probability of the attributes' values of tuple t given a model of the data, M, i.e. $t[A_1], \ldots, t[A_K]|M)$, assuming that there are K attributes. According to an example, it is assumed that the tuples are independent. This is usually the case when tuples are acquired in a single relation one at a time through, for example, a data entry form. Recursively applying the probability rule that says p(a, b|c)=p(a|c). p(a|b, c) results in:

$$p(t \mid \mathcal{M}) = p(t[A_1], \ldots, t[A_K] \mid \mathcal{M}) =$$
$$p(t[A_2] \mid t[A_2], \ldots, t[A_K], \mathcal{M}) \cdot p(t[A_2] \mid t[A_3], \ldots, t[A_K], \mathcal{M}) \cdot \ldots$$
$$p(t[A_{k-1}] \mid t[A_K], \mathcal{M}) \cdot p(t[A_K] \mid \mathcal{M})$$

The probability of a value t[A] given the rest of the tuple's attributes values is obtained similarly to the prediction probabilities derived from the learnt model. Hence, each term in the product of the equation above can be replaced by $p(t[A_K]|M)$ and therefore, the likelihood can be defined as:

$$L(D \mid \mathcal{M}) = \sum_{\forall t \in D} \sum_{\forall A \in attr(R)} \log p(t[A] \mid \mathcal{M})$$

where p(t[A]|M) is the prediction probability of the value t[A] obtained from the model M. Given an update u to replace an erroneous value v by a new value v' for t[A], the likelihood measure for u, l(u) is:

$$l(u) = \log p(t[A] = v' \mid \mathcal{M}) - \log p(t[A] = v \mid \mathcal{M})$$

According to an example, the above approaches for minimising data changes whilst maximising the likelihood that a particular change results in the most accurate database update are combined in order to provide a system and method for repairing inaccurate, erroneous or missing data values in one or more records (or tuples) of a database. Maximizing the data likelihood for a set of models takes advantage of dependencies captured by the ML techniques from the data and allows them to provide candidate replacement data values which can be used to repair missing or inaccurate values.

According to an example, a predefined parameter δ representing a maximum number of tolerated database replacements is used. The parameter can be selected automatically or can be selected by a user via user input to a suitable system or apparatus. Accordingly, subject to the requirement that maximum likelihood for an update or set of updates is attained, a number of permitted database updates is constrained according to Dist(D,D')≤δ. In an example, it can be assumed that more than 50% of the values in a dataset should be correct. Note that this assumption is practical and widely acceptable for most organizations, however other alternatives are possible, including the case where anywhere between 0-100% of the values in a dataset are considered incorrect, missing or otherwise inaccurate in some way. Under such an assumption, learning models and obtaining predictions may be performed once. A list of predicted updates for the database can then be determined, each having a benefit (likelihood) and a weight (cost) associated with them. The subset of updates that would maximize the overall likelihood subject to the total cost constraint described above can then be found.

Given a set of updates U, one predicted update by an ML model for each t[A], and for each update u, the determination of: (i) the likelihood measure l(u), and (ii) the cost, $c(u)=d_A(v, v')$ where the update replaces v by v', a method according to an example computes the set of updates $U' \subseteq U$ such that:

$$\sum_{\forall u \in U'} l(u) \text{ is maximum subject to: } \sum_{\forall u \in U'} c(u) \leq \delta$$

FIG. 1 is a schematic block diagram of a method for determining a set of updates for a database. A database instance D (100) includes erroneous values in a relation schema R which is defined over a set of attributes, $A=\{A_1, \ldots, A_K\}$ (101). A set of partitioning functions 102 or criteria $F=\{f_1, \ldots f_j\}$ are provided for partitioning tuples (records) of the database 100. Applying function $f_j$ will partition the tuples in D into the partitions or blocks $\{b_{1j}, b_{2j}, \ldots\}$. Accordingly, in block 105 data is partitioned using the partitioning functions F. Each function $f_j \in F$ partitions D into blocks $\{b_{1j}, b_{2j}, \ldots\}$. In block 107, for each block $b_{ij}$, a machine learning model (or a set of models) $M_{ij}$ is learnt from the (possibly) clean tuples to predict each attribute value. In block 109 the $M_{ji}$ are used to predict the attributes values of each tuple $t \in b_{ij}$. The predicted tuple is considered a candidate tuple repair including replacement values for a record and can be stored in a temporary repair storage device 111. A set of candidate tuple repairs for each tuple is therefore determined because each tuple is a member of several data partitions according to an example.

According to an example, horizontally partitioning the data (105) refers to the procedure of subdividing tuples into a set of overlapping subsets. This is done using the criterion (or partition function) $f$ as described above that maps each tuple to one of a set of partitions. In an example, the multiple criteria $F=\{f_1, \ldots, f_j\}$ are used to partition the dataset in different ways. Each tuple t is mapped to a set of partitions resulting from the mapping by the individual criteria. That is to say:

$$F(t) = \cup_{\forall j} f_j(t)$$

One way to choose the criteria is "Blocking", where partitions are constructed under the assumption that similar tuples will fit in the same block or that tuples across different blocks are less likely to be similar. Many techniques for blocking have been introduced for the detection efficiency of duplicate records, and any such suitable method can be used according to an example.

In an example, data can be partitioned by repeating, |F| times, the process of randomly sampling a small number of tuples from the dataset to be clustered in $$\frac{|D|}{b}$$

clusters. Each tuple is assigned to the closest cluster as its corresponding partition name. This process allows different blocking functions due to the random sample used for each iteration. Moreover, the tuples assigned to the same partition have common or similar features due their assignment to the closest cluster. Another way to partition the dataset according to an example is to use random partition functions. In this case, given b (the average number of tuples per partition) each tuple can be assigned to a part name $b_{ji}$, where i is a random number from $$\left\{1, \ldots, \left\lceil \frac{|D|}{b} \right\rceil \right\},$$

and j=0 initially. This process can be repeated |F| times with j incremented each time.

In block 113, there is a loop on each tuple $t \in D$ to retrieve the candidate tuple repairs from the repair storage device 111 and to determine the final tuple repair, as will be described below in more detail. Each iteration in 113 does not depend on other iterations. Accordingly, the method of FIG. 1 can be parallelized if desired.

As described, each tuple will be a member of different partitions. Each partition is processed independently to learn a model with a local view of the database partition. Each model will provide predictions to its corresponding partition depending on its local view.

In the table below, the data provided can be partitioned based on the Sex attribute (as a partition function) for example to provide tuples $\{t_1, t_2, t_3\}$ in one partition and tuples $\{t_4, t_5\}$ in another. Learning models using these partitions can therefore provide expert models, such as an expert model based on the person's sex for example. Another function may use the 'Edu' attribute to provide partitions $\{t_1, t_3\}, \{t_2, t_4, t_5\}$. Here, the models are experts based on the person's educational level. The four partitions can be processed separately for prediction tasks.

|       | DoB  | Sex | Edu   | Salary | City       | State | Zip   |
|-------|------|-----|-------|--------|------------|-------|-------|
| $t_1$ | 1980 | M   | M.Sc. | 65     | Lafayette  | IN    | 47907 |
| $t_2$ | 1980 | M   | B.Sc. | 65     | Lafayette  | IN    | 47907 |
| $t_3$ | 1982 | M   | M.Sc  | 30     | Lafayette  | IN    | 47907 |
| $t_4$ | 2011 | F   | B.Sc. | 60     | Chicago    | IL    | 60614 |
| $t_5$ | 2011 | F   | B.Sc. | 60     | WLafayette | IL    | 47906 |

According to an example, a dataset (data block) such as database 100 is preprocessed to identify the most likely erroneous tuples to be excluded or considered as low weight training instances. To this end, a preliminary model can be learnt from the data block and used to mark potentially erroneous tuples with an initially low probability, so that they will not interfere with the prediction.

The selection of the ML model to use is typically orthogonal to the methods outlined herein. It is assumed that the model M can provide predicted values for records as well as their prediction probability $p(t[A]=v|M)$. According to an example, Decision Tree and Naive Bayesian methods can be used, but many other methods may be considered as desired.

For a set of M models, one for each attribute, i.e., $M=\{M_1, \ldots, M_K\}$, each model $M_i$ predicts the value $t[A_i]$ of a given tuple t. Model $M_{ij}$ is learnt from partition $b_{ij}$. Accordingly, $M_{ij}$ can be considered to be trained for the purpose of predicting the attribute values of $t \in b_{ij}$. According to an example, training examples in the form $\langle t[attr(R)\backslash A_k], t[A_k]\rangle$ are used to train the model $M_k$. In this form, $t[attr(R)\backslash A_k]$ is the original tuple without attribute $A_k$, and $t[A_k]$ denotes the value to be predicted.

For a given partition b, once the $M_1, \ldots, M_K$ are trained, a candidate tuple repair is generated for t using the predicted attributes' values. If $M_k(t)$ is the predicted value of $t[A_k]$ in tuple t, then the tuple repair of t is $t'=\langle M_1(t), \ldots, M_K(t)\rangle$. The model is also used to compute the prediction probability of the original values $p(t[A_k]|M_k)$ and the new predicted values $p(M_k(t)|M_k)$.

Typically, it is possible to identify a set of attribute values which may be erroneous, and therefore the models can be trained to predict for only these attribute values such that the remainder of the attribute values are trusted. In other words, for a trusted attribute value for $A_k$, it can be assumed that $M_k(t)=t[A_k]$, or that the same original value in the database with a prediction probability equals 1.

In order to be conservative in considering the predictions from each block and its model, a mechanism to measure the reliability of a model and adapt the obtained prediction probability accordingly to support or detract from the model's predictions can be used. Two components can be used to aid in judging the reliability of a model: (i) the model quality, which is classically quantified by its loss $$L(M_k) = \frac{1}{|b|}\sum_{t \in b} d_{A_k}(M_k(t), t[A_k]),$$

where $|b|$ is the number of tuples in partition b, and $d_{A_k}$ is a distance function for the domain of attribute $A_k$; and (ii) the size of the block (because, typically, the smaller the block the less reliable the predictions). Hence, the reliability of model $M_k$ can be written as:

$$R(M_k) = \frac{|b|}{|D|}\left[1 - \frac{1}{|b|}\sum_{t \in b} \text{dist}_{A_k}(M_k(t), t[A_k])\right]. \quad (7)$$

Finally, the prediction probabilities obtained from model $M_k$ can be scaled to be:

$$\tilde{p}(t[A_k]|M_k) = p(t[A_k]|M_k) \times R(M_k).$$

As mentioned above, a tuple t will be a member of $|F(t)|$ data partitions. From each partition two suggested tuple repairs for t are provided: i) a tuple containing the predicted values using the models along with their prediction probabilities, and ii) the original tuple itself with the computed prediction probabilities from the models. Hence, for each tuple t a set of $2|F|$ single tuple repairs $\{t'_1, \ldots, t'_{2|F(t)|}\}$ is generated which includes the candidate replacement values and their respective probabilities. According to an example, the generated tuple repairs and the prediction probabilities can be stored in the temporary repair storage device 111 with the following schema: $\{t\_id, partition, origin, A_1, \tilde{p}_1, \ldots, A_K, \tilde{p}_K\}$, where t_id is the original tuple identified, partition is the partition name, and $A_k$, $\tilde{p}_k$ stores the predicted value of attribute $A_k$ along with its probability $\tilde{p}_k$. The origin indicates whether the tuple repair is a prediction or it is the original tuple.

In partition $b_{ij}$, the corresponding model $M_{ij}=\{M_1^{(ij)}, \ldots, M_K^{(ij)}\}$ predicts (or votes for) a single tuple repair for $t \in b_{ij}$, where $M_k^{(ij)}$ votes for attribute $A_k$'s value. According to an example, one way to find the final tuple repair for t is to use majority voting for each attribute. This can be done by considering each attribute A separately and finding the most voted value from the predicted values for A across all the partitions that contain t. A majority voting strategy implies the assumption that the models $\{M_1^{(ij)}, \ldots, M_K^{(ij)}\}$ are independent. However, each of $M_k^{(ij)}$ was learnt from the same partition $b_{ij}$, thus the predicted values in a single tuple repair are all dependent on its corresponding original partition. Therefore, according to an example the dependence between $M_k^{(ij)}$ is taken into account to find the voted solution that maximizes the certainty across the partitions (i.e., voting).

Accordingly, it is desired to find the final tuple repair $\langle a^*_1, \ldots, a^*_K\rangle$ such that the joint probability $p(a^*_1, \ldots, a^*_K|M_1, \ldots, M_{|F|})$ is a maximum. Typically, this will be computationally infeasible, because it requires modeling the full joint probabilities between all the attributes values. Maximizing the pairwise association between the predicted values implies maximizing the full association between the predicted values. Instead, a search for the values that can maximize all the pairwise joint probabilities is performed. Hence, the final repair is the one that will maximize the product of prediction probabilities for each attribute pair.

Accordingly, given a set of single tuple repairs $\{t'_1, \ldots, t'_{2|F|}\}$ for tuple t along with the prediction probabilities of each attribute value, (i.e., for $t'_j=\langle a_1^{(j)}, \ldots, a_K^{(j)}\rangle$, there exist the corresponding prediction probabilities $p(a_k^{(j)})$) a repair selection problem according to an example is to find the tuple repair $t'=\langle a'_1, \ldots, a'_K\rangle$ such that the following sum is maximum:

$$\sum_{\forall a^*_i, a^*_j, i \neq j} p(a^*_i) \times p(a^*_j)$$

According to an example, a graph optimization process for finding the K-heaviest subgraph (KHS) in a K-partite graph (KPG) can be used to find suitable tuple repairs. Accordingly, the predicted single tuples for the original tuple t are used to construct a graph, where each vertex is an attribute value, and an edge is added between a pair of vertices when the corresponding values co-occur in a generated tuple repair for t. The edges have a weight derived from the prediction probabilities of the values corresponding to the vertices. This is applied for each tuple separately, and therefore, this phase can be efficiently parallelized.

In an instance of the KHS problem, a graph G=(V,E) is provided, where V is the set of vertices of size n, E is the set of edges with non-negative weights ($W_{wv}$ denotes the weight on the edge between vertices w,v), and a positive integer K<n. The goal is to find V'⊂V, |V'|=K, where $\Sigma_{(w,v) \in E \cap (V' \times V')} W_{wv}$ is maximum. In other words, the goal is to find a K-vertex subgraph with the maximum weight.

A graph G=(V,E) is said to be K-partite if V can be divided into K subsets $\{V_1, \ldots, V_K\}$ such that two vertices in the same subset cannot be adjacent. This KHS in KPG problem is that of finding KHS in a K-partite graph such that the subgraph contains a vertex from each partite.

Figure 2:
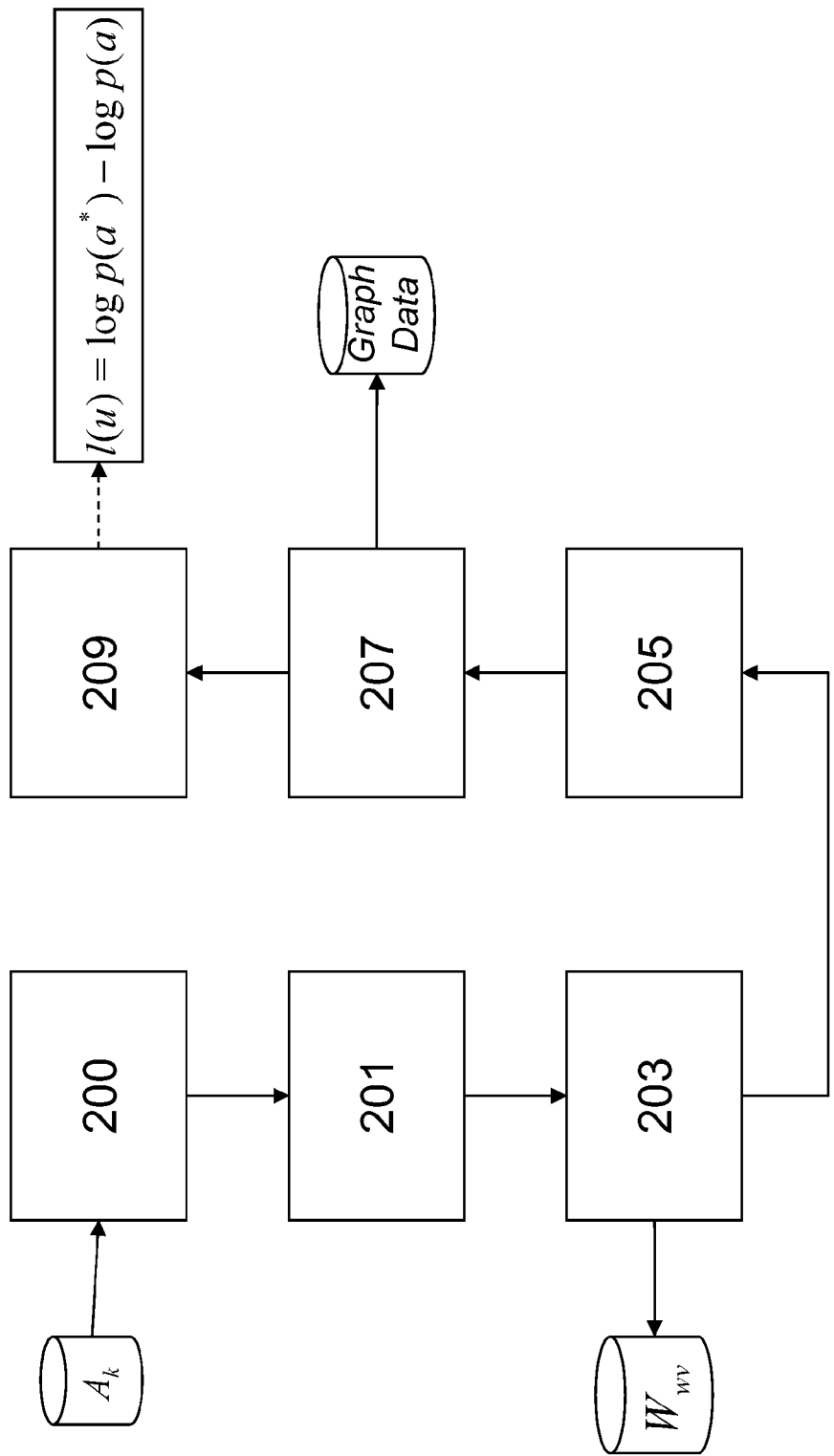
FIG. 2 is a schematic block diagram of a method to map a repair selection problem according to an example.

FIG. 2 is a schematic block diagram of a method to map a repair selection problem to a KHS in KPG problem. Given a set of single tuple repairs $t'_1, \ldots, t'_{2|F(t)|}$ for tuple t, where $t'_j = \langle a_1^{(j)}, \ldots, a_K^{(j)} \rangle$ and K is the number of attributes the process can proceed as follows:

1. Build vertex sets for each attribute $A_k$—For each attribute $A_k$, create (200) a vertex v for each distinct value in $\{a_k^{(1)}, \ldots, a_k^{(2|F|)}\}$. Note that there is a set of vertices for each attribute $A_k$ (i.e. the graph is partite).

2. Add edges—Add an edge 201 between vertices v,w when their corresponding values co-occur in a predicted single tuple repair. Note that v, w cannot belong to the same vertex set.

3. Assign edge weights—For an edge between v, w, the weight is computed (203) according to the following: assuming that the models $M_j$ (which predicted $t'_j$) predicted the corresponding values of w,v with probabilities $p(w^{(j)})$, $p(v^{(j)})$, then the edge weight $W_{wv}$ between w,v is, according to an example:

$$W_{wv} = \sum_{\forall j} p(w^{(j)}) \times p(v^{(j)})$$

The number of vertices is the number of distinct values in the tuple repairs.

Finding the KHS in the constructed KPG is a solution to the repair selection problem. The underlying idea is that the resulting K-subgraph will contain exactly a single vertex from each vertex set. This corresponds to selecting a value for each attribute to construct the final selected tuple repair. Moreover, the weight of the selected subgraph corresponds to maximizing the summation described above.

In block 205 the likelihood measure of the final updates to a* values is calculated by first estimating its overall probability p(a*) from edges' weights in the KHS subgraph using $$p(a^*) = \frac{1}{2|F|} \sum_{\forall a_k^*} e_{a_k^*, a^*}.$$

This quantifies the association strength of the predicted value a* to the other predicted attributes' values $a^*_k$. Similarly, for the original attributes' values $t = \{a_1, \ldots, a_K\}$ a graph is constructed in block 207 using their |F| obtained prediction probabilities to provide graph data. The graph contains only K vertices corresponding to the original values. Then for each original value a, $$p(a) = \frac{1}{|F|} \sum_{\forall a_k} e_{a_k, a}.$$

Finally, in block 209 the update u to change a to a* has the likelihood measure l(u)=log p(a*)−log p(a).

There are numerous examples for the general problem of finding the KHS, and many approximate algorithms have been introduced. Typically for example, the problem can be modeled as a quadratic 0/1 program, and random sampling and randomized rounding techniques can be applied resulting in a polynomial-time approximation scheme. Other alternatives are possible as will be appreciated.

According to an example, a heuristic can be defined to repeatedly delete a vertex with the least weighted degree from the current graph until K vertices are left. The vertex weighted degree is the sum of weights on the edges attached to it. According to an example, the vertex with least weighted degree is removed providing it is not the only vertex left in the partite graph, otherwise, the next least weighted degree vertex is determined and removed.

Figure 3:
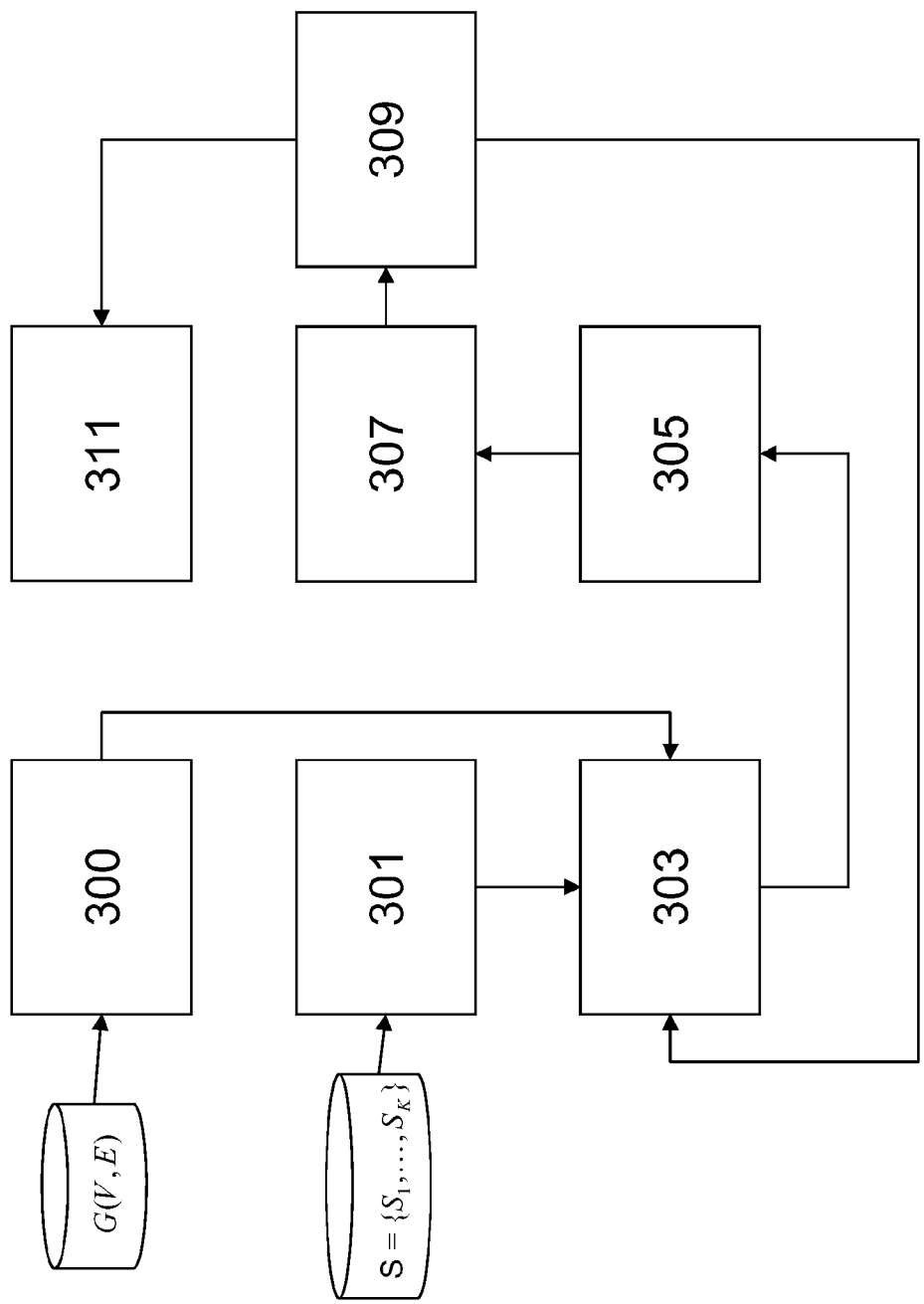
FIG. 3 is a schematic block diagram of a process to determine a tuple repair from a set of replacement candidate values according to an example.

FIG. 3 is a schematic block diagram of a process to determine a final tuple repair from a set of replacement candidates. There are two inputs to the algorithm: (i) the constructed graph, 300, G(V,E) from generated tuples repairs and (ii) the sets of vertices, 301, $S = \{S_1, \ldots, S_K\}$, where each $S_k$ represents the predicted values for attribute $A_k$. For each vertex v, its current weighted degree is represented by WeightedDegree $$(v) = \sum_{\forall e_{vw} \in E} W_{vw},$$

which is the sum of the edges weights that are incident to v.

A solution is found when there is only one vertex in each vertex set. That is, when |S|=1 ∀S∈S. In block 303 the vertex v that has the minimum weighted degree is determined. In block 305 all edges incident to v are removed and the WeightedDegree(w) is updated by subtracting $W_{wv}$, where w was connected to v by the removed edge $e_{wv}$. In block 307 vertex v is removed from G and from its corresponding vertex set. In block 309 it is determined if the removal of a vertex in block 307 has resulted in a final graph state 311. If not, the next vertex v that has the minimum weighted degree is determined in block 303. The process is therefore repeated until an end state in block 311 is reached.

Referring back to the table above, and specifically tuple $t_1$, an example of a method for determining a replacement record will now be described. For clarity, only 3 attributes are used so as to have a readable 3-partite graph. Assume that 8 possible tuple repairs are obtained (because $t_1$ was a member of 4 partitions for example). FIG. 4 is a table illustrating the corresponding tuple repairs with the prediction probability of each value. The first 4 tuples represent the original tuple as a tuple repair with the prediction probabilities of the original values obtained from the 4 models learnt from each partition individually. For each tuple repair, the source partition is denoted on the right of FIG. 4 ($b_1$ to $b_4$).

FIGS. 5a-e illustrate a constructed 3-partite graph derived from these repairs according to an example. For each attribute, there is a vertex set. For example the corresponding set for zip contains {47906, 47907}. In the graph, the actual attributes values are replaced by a character abbreviation to have a more compact form {6→47906, 7→47907, L→Lafayette, W→Wlafayette, F→lfyte, N→IN, I→IL}.

For $t'_5$, the prediction probabilities of "Lafayette" and "IN" are 0.9 and 0.7 respectively, and this is the only co-occurrence for these two values. Therefore, there is an edge between L and N with weight 0.63=0.9×0.7. The values IN and 47907 co-occur in $t'_5$ and $t'_7$ with respective probabilities in each co-occurrence of $\{0.7,0.5\},\{0.6,0.6\}$. Hence there is an edge between 7 and N with weight 0.71=0.7× 0.5+0.6×0.6. The rest of the graph is constructed in a similar way.

The vertex with the least weighted degree to be removed is determined. The first vertex is F, which has a weighted degree equal 0.24=0.12+0.12, corresponding to the two incident edges in F. After vertex W is removed next in (FIG. 5b), the vertex set of the city is left with only one vertex, L. In this case, vertex L is not considered for removal even if it has the least weighted degree as it is the final remaining vertex for that attribute, and is therefore required in order to provide a complete replacement set of data for a record in question.

The final solution is shown in FIG. 5e, which corresponds to a subgraph with 3 vertices. That is, there is a vertex from each initial partite. This graph is the heaviest (i.e., the sum of the edges weight is the maximum) subgraph of size 3, where each vertex belongs to a different partite. Note that the final graph does not have to be fully connected.

Thus, according to the example, the final selected tuple repair is {47907, Lafayette, IN}. The state attribute has a suggested update u to replace "IL" by "IN". To compute l(u), the final probabilities of each of the two values are determined. For the value "IN" the graph in FIG. 5e can be used because it is the new predicted value, while the value "IL" is an original value, therefore, the original values from the table graph in FIG. 4 can be used. The original values graph is constructed in the same way as described above, but using only the tuples $\{t'_1, t'_2, t'_3, t'_4\}$, i.e., the original values and their prediction probabilities obtained from each partition. Note that another graph optimization problem is not being solved for the original values of the tuple because there is already a single value for each attribute in the constructed graph.

For the state attribute, the final probability of the new predicted value "IN" can be obtained from FIG. 5e as $$p(IN) = \frac{0.71 + 0.63}{8} = 0.16.$$

For the original state value, IL, $$p(IL) = \frac{0.14 + 0.16}{4} = 0.075.$$

Finally, the likelihood measure of updating the state attribute of $t_1$ to IN is (log 0.16−log 0.075)≈0.33.

Note that if majority voting is used while using the prediction probability as the voter's certainty, the tuple repair will be {47906, Lafayette, IL}. This solution does not take into account the association between the predicted values within the same tuple repair. For example, there is a stronger association between 47907 and IN than for 47906 and IL. This association is reflected on the weights on their corresponding edges. The same applies for the association between Lafayette and IN, which have a stronger correlation than Lafayette and IL.

Figure 6:
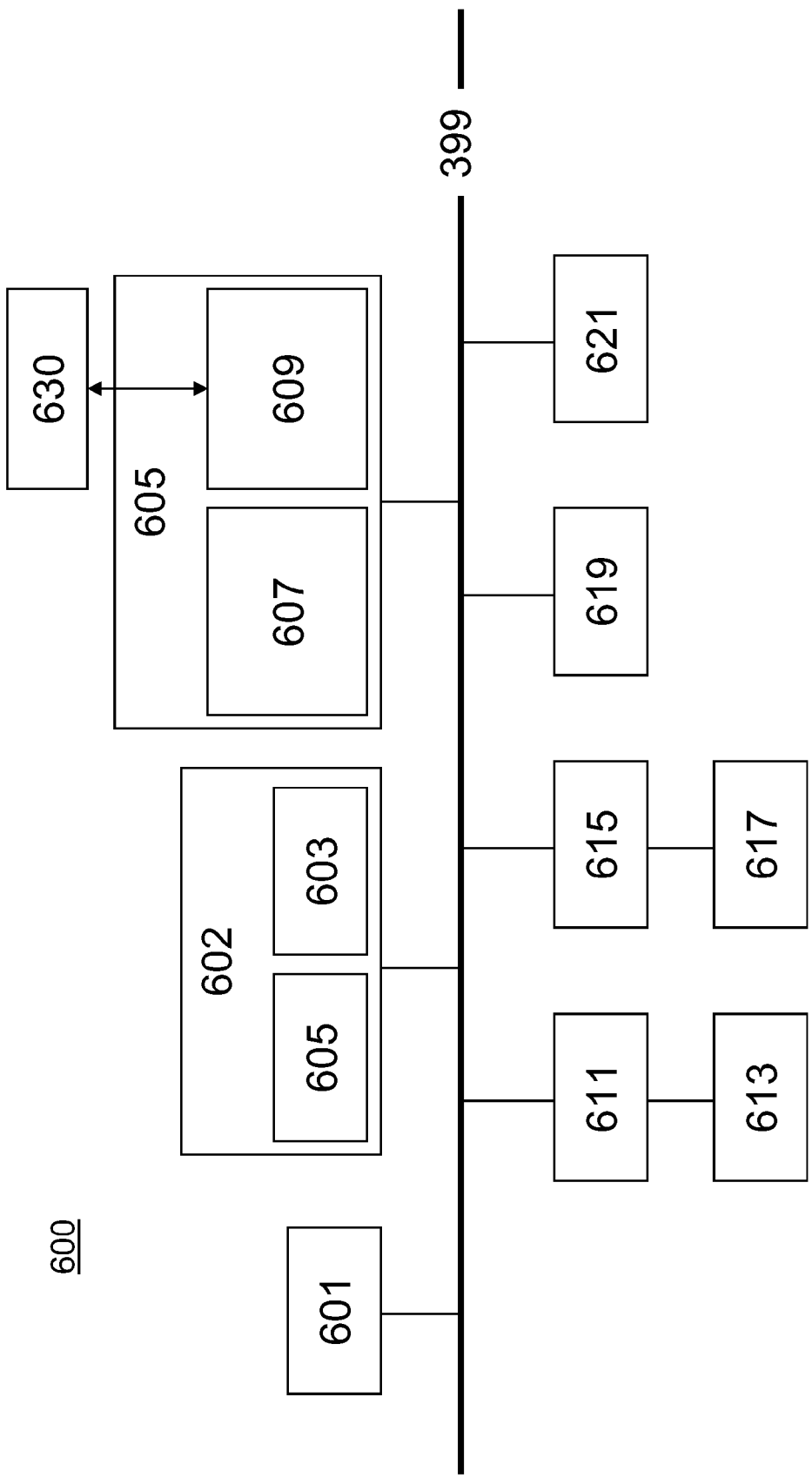
FIG. 6 is a schematic block diagram of an apparatus according to an example.

FIG. 6 is a schematic block diagram of an apparatus according to an example suitable for implementing any of the system or processes described above. Apparatus 600 includes one or more processors, such as processor 601, providing an execution platform for executing machine readable instructions such as software. Commands and data from the processor 601 are communicated over a communication bus 399. The system 600 also includes a main memory 602, such as a Random Access Memory (RAM), where machine readable instructions may reside during runtime, and a secondary memory 605. The secondary memory 605 includes, for example, a hard disk drive 607 and/or a removable storage drive 630, representing a floppy diskette drive, a magnetic tape drive, a compact disk drive, etc., or a nonvolatile memory where a copy of the machine readable instructions or software may be stored. The secondary memory 605 may also include ROM (read only memory), EPROM (erasable, programmable ROM), EEPROM (electrically erasable, programmable ROM). In addition to software, data representing any one or more of updates, possible updates or candidate replacement entries, and listings for identified tuples may be stored in the main memory 602 and/or the secondary memory 605. The removable storage drive 630 reads from and/or writes to a removable storage unit 609 in a well-known manner.

A user interfaces with the system 600 with one or more input devices 611, such as a keyboard, a mouse, a stylus, and the like in order to provide user input data . The display adaptor 615 interfaces with the communication bus 399 and the display 617 and receives display data from the processor 601 and converts the display data into display commands for the display 617. A network interface 619 is provided for communicating with other systems and devices via a network (not shown). The system can include a wireless interface 621 for communicating with wireless devices in the wireless community.

It will be apparent to one of ordinary skill in the art that one or more of the components of the system 600 may not be included and/or other components may be added as is known in the art. The system 600 shown in FIG. 6 is provided as an example of a possible platform that may be used, and other types of platforms may be used as is known in the art. One or more of the steps described above may be implemented as instructions embedded on a computer readable medium and executed on the system 600. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

According to an example, a ML model 605 can reside in memory 602 and operate on data from a partition of a database 100 to provide a set of tuple repair values and probabilities 603. A storage device 111 can include a HDD such as 605, or can be provided as a removable storage unit 609.

What is claimed is:

1. A computer implemented method for generating a set of updates and updating a database comprising multiple records including erroneous, missing and inconsistent values, the method comprising:
    using a set of partitioning functions for subdividing the records of the database into overlapping multiple subsets;
    allocating respective ones of the records to multiple subsets according to a predetermined criteria for mapping records to subsets;
    applying multiple machine learning models to each of the subsets to develop expert models of the predetermined criteria;
    applying the expert models to each of the subsets to determine at least one of respective prediction probabilities and respective candidate replacement values;
    representing a tuple repair for a record using at least one of the respective candidate replacement values and the respective prediction probabilities to select replacement values for the record from among the candidate replacement values which maximise the probability for the values of the record for an updated database; and
    repairing the values in the multiple records of the database using the replacement values.

2. A method as claimed in claim 1, further comprising minimising a distance measure determined using a distance function between the updated database and the database.

3. A method as claimed in claim 1, further comprising limiting a number of changes to be made to the database to arrive at the updated database using the replacement values to a predetermined maximum value.

4. A method as claimed in claim 3, further comprising selecting the maximum value based on the size of the database and a number of desired iterations for the steps of using, allocating, applying and computing.

5. A method as claimed in claim 1, further comprising determining duplicate records of the database, and wherein subdividing includes subdividing records of the database minus the determined duplicate records.

6. A method as claimed in claim 1, wherein the set of partitioning functions are horizontal partitioning functions constructed according to a requirement that similar records are allocated to the same partition.

7. A method as claimed in claim 6, wherein similar records are determined using a hash function to generate checksums for respective ones of the records and by comparing the checksums.

8. A method as claimed in claim 1, wherein selecting replacement attribute values includes generating a graph including multiple vertices and multiple edges for connecting certain ones of the vertices, wherein each vertex of the graph represents an attribute value, and an edge connecting two vertices represents a probability for the occurrence of those attribute values in a single replacement record.

9. A method as claimed in claim 1, wherein the number of partition functions in the set of partition functions is restricted to a predetermined maximum number.

10. The method as claim in claim 1, wherein the overlapping multiple subsets are in the database.

11. A computer program embedded on a non-transitory tangible computer readable storage medium, the computer program including machine readable instructions that, when executed by a processor, implement a method for updating a database comprising:
    partitioning records of the database into multiple overlapping sets of records using a set of partitioning functions with a predetermined criteria over the records of the database;
    developing expert models of the predefined criteria by applying multiple machine learning models to the multiple overlapping sets of records;
    determining a set of candidate replacement data values for respective records in each of the multiple overlapping sets;
    selecting an update for a record from the set of candidate replacement data values which maximally preserves a relationship in the database; and
    updating the database using the selected update to provide an updated database with a minimal number of alterations.

12. The computer program embedded on a non-transitory tangible computer readable storage medium as claimed in claim 11 further comprising instructions that, when executed by the processor, implement a method for updating a database further comprising minimising a distance measure determined using a distance function between the updated database and the database.

13. The computer program embedded on a non-transitory tangible computer readable storage medium as claimed in claim 11 further comprising instructions that, when executed by the processor, implement a method for updating a database further comprising limiting a number of changes to be made to the database to arrive at the updated database to a predetermined maximum value.

14. The computer program embedded on a non-transitory tangible computer readable storage medium as claimed in claim 13 further comprising instructions that, when executed by the processor, implement a method for updating a database further comprising selecting the maximum value based on the size of the database and a number of desired iterations for the steps of partitioning, determining, selecting and updating.

15. The computer program embedded on a non-transitory tangible computer readable storage medium as claimed in claim 11 further comprising instructions that, when executed by the processor, implement a method for updating a database further comprising determining duplicate records of the database, and wherein partitioning is performed on records of the database minus the determined duplicate records.

16. The computer program embedded on a non-transitory tangible computer readable storage medium as claimed in claim 11 further comprising instructions that, when executed by the processor, implement a method for updating a database wherein the set of correlations are constructed using machine learning models according to a requirement that similar records are allocated to the same partition.

17. The computer program embedded on a non-transitory tangible computer readable storage medium as claimed in claim 16 further comprising instructions that, when executed by the processor, implement a method for updating a database wherein similar records are determined using a hash function to generate checksums for respective ones of the records and by comparing the checksums.

18. The computer program embedded on a non-transitory tangible computer readable storage medium as claimed in claim 11 further comprising instructions that, when executed by the processor, implement a method for updating a database further comprising:

generating a graph including multiple vertices and multiple edges for connecting certain ones of the vertices, wherein each vertex of the graph represents an attribute value of a record, and an edge connecting two vertices represents a probability for the occurrence of those attribute values in a single record.

19. A method for repairing data values in multiple records of a database comprising:

partitioning records of the database into multiple overlapping partitions using a set of partitioning functions with a predetermined criteria over the records of the database;

determining a set of candidate changes for the records which simultaneously minimise a number of alterations to the database and maximise a probability value for the accuracy of the candidate changes; and repairing the multiple records of the database using the determined set of candidate changes.

20. A method as claimed in claim 19, wherein determining a set of candidate changes includes:

deriving a set of models for records in each partition to determine a probability value for an existing data value and updated data value; and selecting a data value according to the probability value to provide a candidate change for a tuple repair to the database.

* * * * *